United States Patent [19]

Yamaoka

[11] 4,408,887
[45] Oct. 11, 1983

[54] CONTINUOUS KNEADER

[76] Inventor: Kishihiro Yamaoka, 1-1001, Ikedakita-machi 24, Neyagawa-shi, Osaka, Japan

[21] Appl. No.: 370,213

[22] Filed: Apr. 20, 1982

[30] Foreign Application Priority Data

Dec. 7, 1981 [JP] Japan .......................... 56-182630[U]
Dec. 7, 1981 [JP] Japan .............................. 56-197368

[51] Int. Cl.$^3$ .............................................. B29B 1/06
[52] U.S. Cl. ...................................... 366/75; 366/76; 366/79; 366/80; 366/82
[58] Field of Search ....................... 366/75, 76, 77, 79, 366/80, 81, 82, 87, 89, 90, 319, 322, 323, 324; 159/2 E

[56] References Cited

U.S. PATENT DOCUMENTS

| 2,213,381 | 9/1940 | Brown | 366/80 |
| 2,505,355 | 4/1950 | Gliss | 366/87 |
| 2,519,014 | 8/1950 | Bankey | 366/82 X |
| 3,239,882 | 3/1966 | Yokana | 366/82 |

Primary Examiner—Harvey C. Hornsby
Assistant Examiner—Arthur D. Dahlberg
Attorney, Agent, or Firm—Jordan and Hamburg

[57] ABSTRACT

A continuous kneader comprising a rotary screw shaft and rotatable within a cylinder for transporting a fluid axially thereof, rotary disks mounted on the shaft and each formed on each side surface thereof with radial projections and recesses arranged alternately, and fixed disks provided on the cylinder and arranged on the opposite sides of each rotary disk coaxially therewith as opposed thereto. Each of the fixed disks is formed on each side surface thereof with radial projections and recesses arranged alternately. The boundary between and defining each projection and the recess adjacent thereto on at least one of the rotary disk and the fixed disk is inclined from the radial direction so that the material supplied from a space between the shaft and the inner surface of the cylinder to the space between the rotary disk and the fixed disk is passed over the rotary disk outer periphery toward the axis of the shaft into the space between the rotary disk and the fixed disk immediately adjacent thereto. The projections and the recesses are so formed as to reduce the space between each rotary disk and the immediately adjacent fixed disk from disk to disk toward the forward end of the cylinder. The apparatus assures an efficient kneading operation although having a compact construction.

5 Claims, 13 Drawing Figures

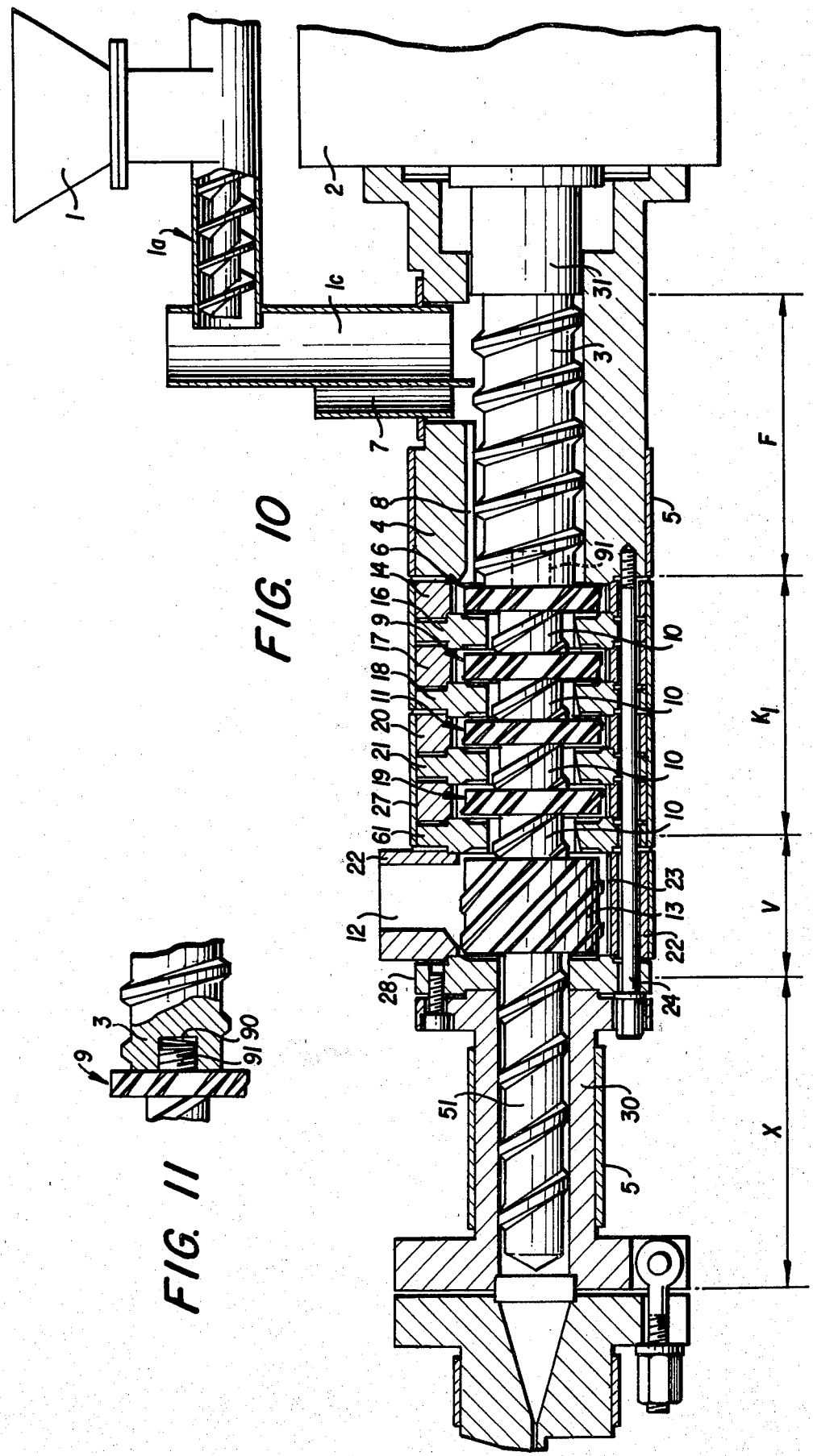

CONTINUOUS KNEADER

The present invention relates to a continuous kneader which is compact in construction, easy to make and capable of kneading materials efficiently.

Continuous kneaders are known which comprise a cylinder and a shaft rotatably provided in the cylinder and which includes a material inlet, a feeding section, a kneading section and an extruding section as arranged in succession. When it is desired to thoroughly knead materials with such an apparatus, the kneading section must have an increased length, consequently making the apparatus large-sized and the interior construction of the cylinder complex. The apparatus then requires much labor.

While the material to be kneaded decreases in volume with the progress of kneading operation, the kneading section of conventional apparatus has a channel for the passage of the material which is uniform in cross sectional area. In such a case, a clearance or space occurs within the channel and progressively increases with the kneading operation, giving rise to difficulty in subjecting the material to pressure which is essential to efficient shearing and mixing. When not subjected to pressure due to an increased space, the material will no longer be kneaded. If the material is not fully kneaded, finely divided ingredients, such as pigments, contained in the material are likely to agglomerate and will be discharged in an unkneaded state. Further if the gas formed during kneading remains in the material without being removed, the material will not be thoroughly kneaded, failing to afford a product of good quality.

Accordingly an object of the present invention is to provide an apparatus in which materials can be kneaded efficiently in every portion of its kneading section.

Another object of the invention is to render the kneading section compact in construction and thereby make the apparatus compact in its over-all construction.

Another object of the invention is to construct the kneading section from a plurality of members in combination and thereby make the apparatus easy to fabricate.

Another object of the invention is to construct the kneading section from the combination of a plurality of members and thereby render the kneading section best suited to the material to be kneaded.

Another object of the invention is to vent the kneading section for degassing the charge, permitting the material to afford a product of good quality.

Still another object of the invention is to degas the charge at the feeding section of the apparatus to enable the kneading section to knead the material efficiently.

Other objects and features of the invention will become apparent from the following description of embodiments with reference to the accompanying drawings, in which:

FIG. 10 is a view partly in vertical section of another embodiment of the invention;

FIG. 11 is a view partly in section and showing a junction of the rotary shaft shown in FIG. 1 or 10;

Figure 1:
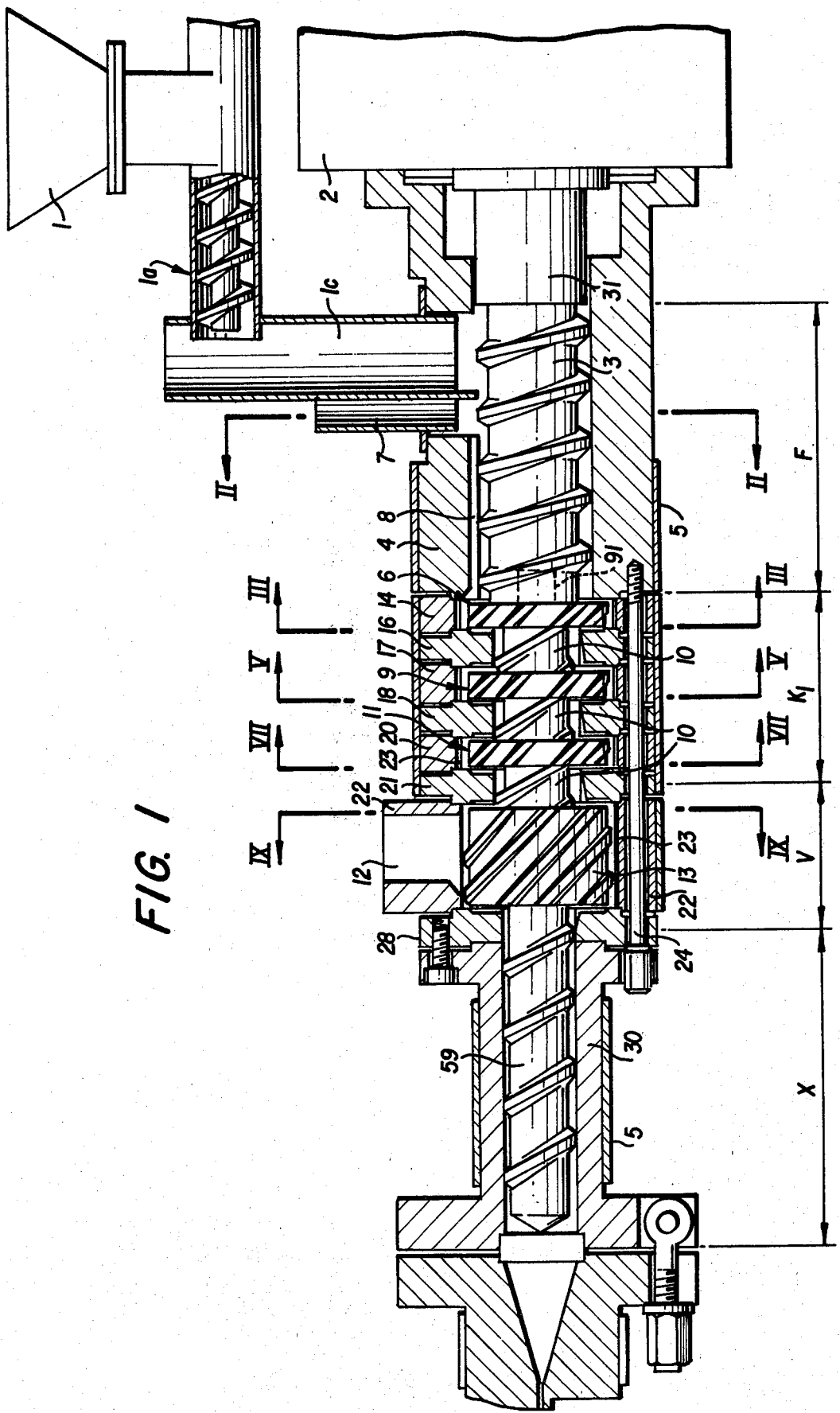
FIG. 1 is a view partly in vertical section of a kneader embodying the invention.

FIG. 1 shows a hopper 1, a metering feeder 1a, a charge inlet 1c and a cylinder 4. A rotary shaft 31 rotatable by a drive unit 2 extends through the cylinder 4. The shaft 31 has helical ridges substantially over the entire length thereof and includes a screw 3 providing a feeding section F at its base end portion and a screw 59 providing an extruding section X at its forward end portion. Between these sections, rotary disks 6, 9 and 11 are mounted on the shaft 31 as spaced apart at a specified spacing and a rotary disk 13 having a larger width is positioned closer to the shaft front end. The rotary disks 6, 9, 11 provide a kneading section K1, and the rotary disk 13 provides a vent section V. A screw 10 is provided between each two adjacent disks.

Figure 2:
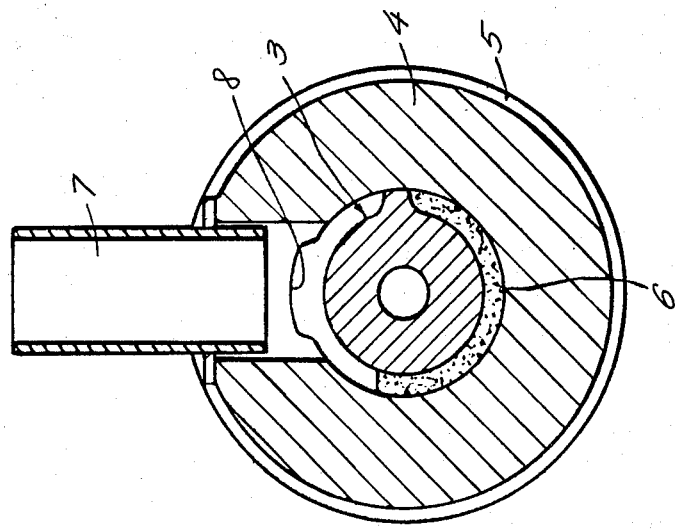
FIG. 2 is a view in section taken along the line II—II in FIG. 1.

Interposed between the cylinder 4 at the base end portion of the shaft 31 and a cylinder 30 having the forward end portion of the shaft inserted therein are annular members 14, 17, 20 surrounding the rotary disks 6, 9, 11 respectively, fixed disks 16, 18, 21 provided between or adjacent the annular members, and an annular member 22 having a vent 12. These members and disks are juxtaposed and connected to the cylinders 4, 30 by tie rods 24. The cylinders are provided with a heater 5. The cylinder 4 is formed in an inside upper portion thereof with a groove 8 continuously extending axially thereof. As seen in FIG. 2, one end of the groove 8 is in communication with a vent 7 opened to the outside.

Figure 3:
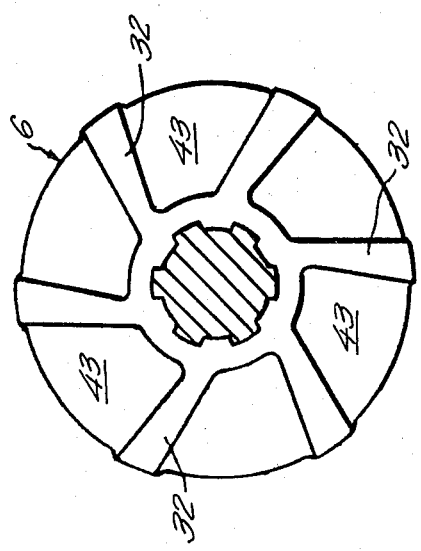
FIG. 3 is a view in section taken along the line III—III in FIG. 1 and partly broken away.
Figure 4:
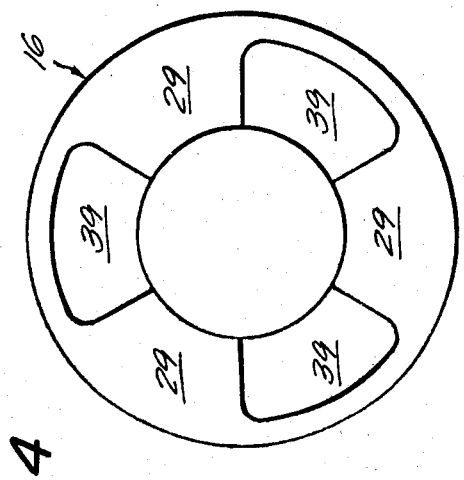
FIG. 4 is an elevation showing a member opposed to the member shown in FIG. 3.
Figure 5:
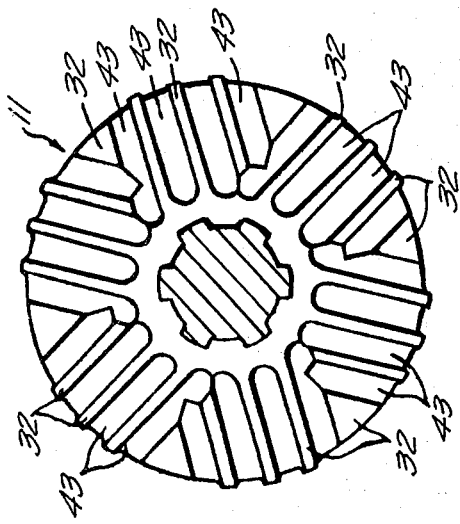
FIG. 5 is a view in section taken along the line V—V in FIG. 1 and partly broken away.
Figure 7:
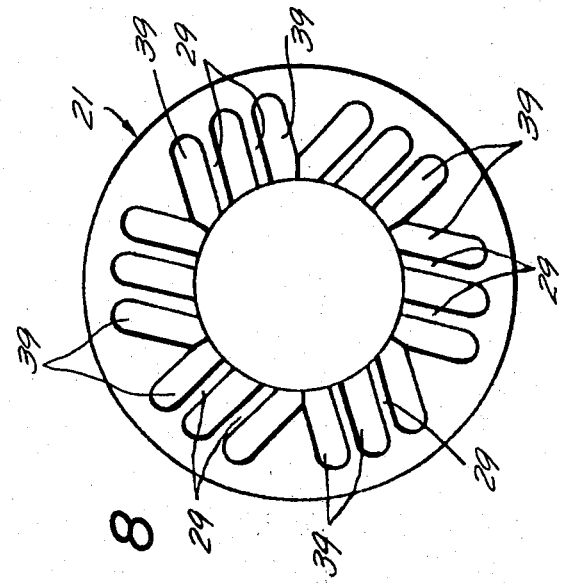
FIG. 7 is a view in section taken along the line VII—VII in FIG. 1 and partly broken away.
Figure 6:
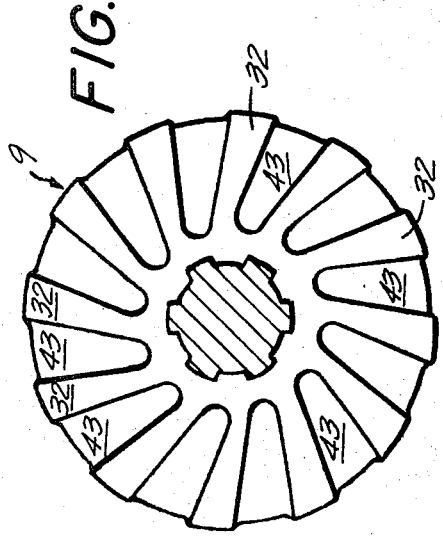
FIG. 6 is an elevation showing a member opposed to the member shown in FIG. 5.
Figure 8:
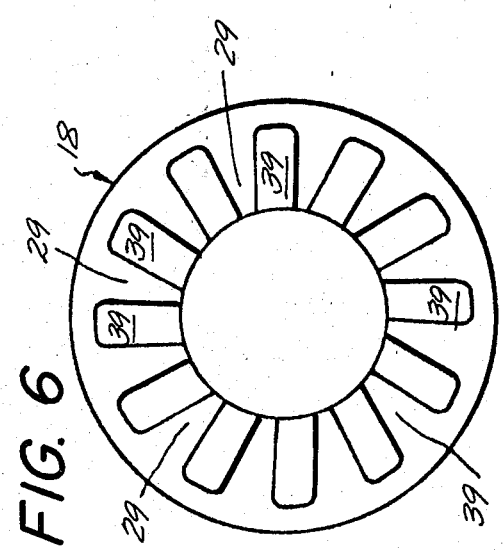
FIG. 8 is an elevation showing a member opposed to the member shown in FIG. 7.

As shown in FIG. 3, the rotary disk 6 is formed on one side with projections 32 extending radially from its center and arranged circumferentially thereof to define recesses 43 therebetween. The disk is substantially similarly shaped on the other side thereof. The outer ends of the projections 32 project from the outer periphery of the rotary disk 6 and extend thereon helically axially thereof to form a screw on the outer periphery of the disk. With reference to FIG. 4, the side of the fixed disk 16 facing the rotary disk 6 is formed with three recesses 39 arranged circumferentially thereof and defining projections 29 therebetween. On the inlet side of the rotary disk 6, each projection 32 is inclined from the radially direction slightly. The direction of inclination is such that the projection is delayed in phase with respect to the direction of rotation of the disk to a greater extent toward the outer periphery. On the outlet side of the disk 6, each projection 32 is inclined in the reverse direction. Consequently the charge from the space between the screw and the cylinder is sent along the inlet side of the rotary disk toward its outer periphery, passed over the outer periphery and thereafter forced through the clearance between the rotary disk and the fixed disk 16 toward the axis of the shaft 31. FIG. 5 shows the rotary disk 9 which has a large number of radial projections 32 defining processes 43 therebetween. The disk 9 is so shaped that an additional projection 32 is formed in the midportion of each recess 43 shown in FIG. 3. FIG. 6 shows the fixed disk 18 opposed to the disk 9 and having a large number of projections 29 which extend radially to define recesses 39 therebetween. Accordingly the space formed between these disks 9, 18 is smaller than the corresponding space between the disks 6, 16 by an amount corresponding to the reduction in the overall volume of the recesses 43, 39 provided that the depths of the corresponding recesses in the two spaces are the same. Further as shown in FIG. 7, the rotary disk 11 has a larger number of projections 32, as well as of recesses 43, then the rotary disk 9. Similarly the fixed disk 21 opposed to the rotary disk 11 has larger numbers of projections 29 and recesses 39 than the fixed disk 18 as seen in FIG. 8.

Thus the volumes of the recesses are decreased from disk to disk to make the channel for the flow of material smaller with the progress of kneading operation. The size of the material flow channel may be decreased by reducing the depths of the recesses with the increase of the number of the projections. The number of the rotary disks, as well as of the fixed disks, and the number of the projections, as well as of the recesses, the shapes of the projections and recesses, etc. may be determined as desired in accordance with the material to be kneaded. Each of the annular members 14, 17, 20 is formed in its inner periphery with grooves 23 extending axially thereof and arranged in the circumferential direction. Thus the annular member has alternating projections and recesses which are opposed to the alternating projections and recesses on the outer periphery of the corresponding rotary disk in the same relation as between the opposed rotary disk and fixed disk. The outer periphery of the rotary disk 13 and the inner periphery of the annular member 22 are also similarly shaped; the outer peripheral ends of projections 32 on the disk 13 provide a screw flight, which is opposed to axial grooves 23 formed in the annular member 22.

Whereas the kneading section thus has a complex configuration due to the opposed arrangement of the fixed disks and the rotary disks, the annular members and the fixed disks interposed therebetween are each independent and are therefore easy to make. Further they are merely fastened together by tie rods and are accordingly easy to assemble. Thus the kneading section can be of a relatively small length to compact the apparatus, which, nevertheless, is easy to fabricate.

FIG. 10 shows another embodiment which has the same construction as the foregoing embodiment except that the kneading section has an additional rotary disk 19, and an annular member 27 and a fixed disk 61 in combination with the disk 19. The rotary shaft 31 of this embodiment is formed, at the forward end of its feed portion 3, with a threaded bore 90 which has screwed therein a projection 91 on another shaft portion extending through the kneading section forward, whereby the shaft portions are connected together. When the shaft is separated at this junction, the forward shaft portion is replaceable. The annular member 27 and the fixed disk 61 are fastened to the cylinder 4 by tie rods 24. In this way, the length of the kneading section is variable most suitably in accordance with the kind of the material to be kneaded.

Figure 12:
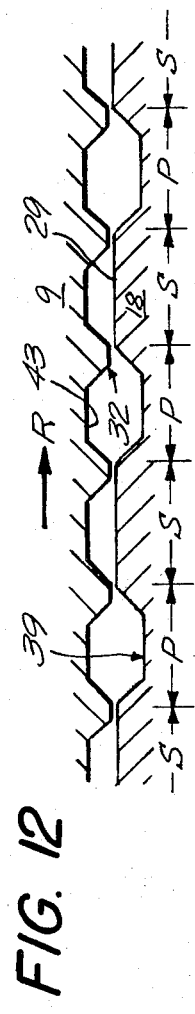
FIG. 12 is a development showing the channel of a kneading section.
Figure 13:
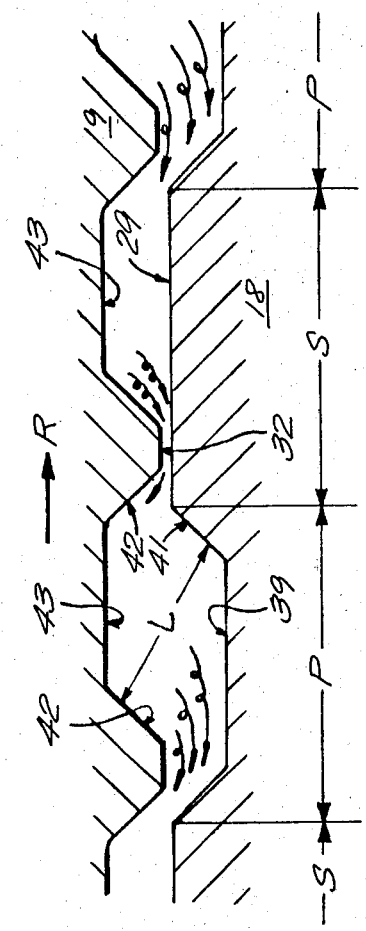
FIG. 13 is a diagram illustrating how a material is kneaded within the channel.
Figure 9:
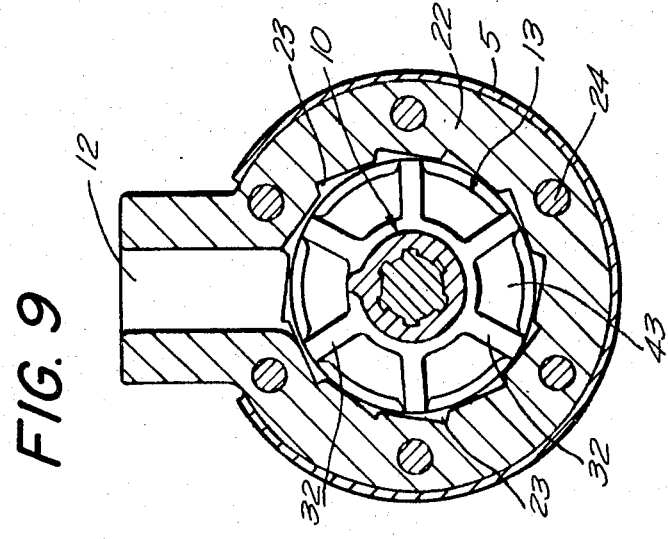
FIG. 9 is a view in section taken along the line IX—IX in FIG. 1.

The operation of the kneader will be described. The rotary shaft 31 is driven by the drive unit, while the metering feeder 1a is operated to feed a material from the hopper 1 to the cylinder 4 at a constant rate. Since the interior of the cylinder 4 is heated by the heater 5, the charge is sent toward the rotary disk 6 while being dried. The gas evolved in the meantime is released through the groove 8 and the vent 7. The material introduced into the kneading section K1 is subjected to compression and shearing while being forced radially outward of the disks, by the opposed surfaces of the rotary disk and the fixed disk which rotate relative to each other. Stated more specifically with reference to FIGS. 12 and 13, the space between the rotary disk and the fixed disk is large where the recess 43 is opposed to the recess 39, slightly smaller where the recess 43 is opposed to the projection 29 and very small where the projection 32 is opposed to the projection 29. Accordingly when the rotary disk moves in the direction of arrow R, the distance L between the boundaries 42 and 41 each defining the adjacent recess and projection on the corresponding disk decreases, with the result that the material in the space defined by these boundaries is subjected to high compression. The material thus compressed is forced into the space between the recessed portion 43 and the projection 29 and further subjected to a great shearing action between the projection 32 and the projection 29. In this way, the material is acted on similarly circumferentially of the disks. Stated more specifically, the compression step P and the shearing step S are repeated alternately in the circumferential direction. On the other hand, the material is acted on also radially of the disks. Since the projection 32 of the rotary disk is inclined with respect to the radial direction as already stated, the projection 32 is progressively brought into opposed relation to the projection 29 from the center radially outwardly of the disks, so that the material is subjected to a radial force while being simultaneously subjected to a circumferential force and is thereby forced radially outward. The outer periphery of the rotary disk has a screw flight provided by the extensions of the projections 32 and opposed to the grooves 23 in the inner periphery of the annular member, so that the material is sent forward while being compressed and sheared as in the space between the rotary disk and the fixed disk. On the opposite side of the rotary disk, the same compression and shearing steps as shown in FIGS. 12 and 13 are repeated. The projections on this side of the rotary disk are so inclined as to forward the material toward the center. On reaching the screw portion 10, the material is fed to the next rotary disk by the action of the screw 10 and thereafter subjected to the same operation as described above. Because the channel for the flow of the material is made smaller toward the forward end of the screw shaft, the material can be subjected to sufficient pressure even if the volume of the material decreases with the progress of the kneading operation. This assures a satisfactory kneading operation. Especially the stepwise increase of the number of projections or recesses increases the frequency with which the projections and recesses on the rotary disk are brought into opposed relation to those on the fixed disk per revolution of the rotary shaft, consequently increasing the number of repetitions of the shearing step S and the compression step P. Additionally the material is folded or turned over repeatedly. The present apparatus therefore assures an efficient kneading operation.

The water and other components contained in the material will be converted to a gas during the kneading operation. The gas is released through the vent 12 while the material passes around the rotary disk 13. Since the rotary disk 13 has a larger axial width than the rotary disks 9, 11, the gas is easily releasable while the material passes over the increased area.

The material completely degassed while passing over the rotary disk 13 is passed through the extruding section X and extruded from the forward end of the kneader.

Briefly the present invention provides a continuous kneader which has a feeding section, a kneading section and an extruding section and in which the kneading section is compact in construction, operates efficiently and has a flow channel which is made gradually smaller. The desired material can be fully kneaded even when the volume of the material decreases with the progress of the kneading operation.

What is claimed is:

1. A continuous kneader comprising a rotary shaft in the form of a screw and rotatable within a cylinder for transporting a fluid axially thereof, a plurality of rotary disks mounted on the shaft and each formed on each side surface thereof with radial projections and recesses arranged alternately, and fixed disks provided on the cylinder and arranged on the opposite sides of each rotary disk coaxially therewith as opposed thereto, each of the fixed disks being formed on each side surface thereof with radial projections and recesses arranged alternately, the boundary between and defining each projection and the recess adjacent thereto on at least one of the rotary disk and the fixed disk being inclined from the radial direction so that the material supplied from a space between the rotary shaft and the inner surface of the cylinder to the space between the rotary disk and the fixed disk is passed over the outer periphery of the rotary disk toward the axis of the shaft into the space between the rotary disk and the fixed disk immediately adjacent thereto, the projections and the recesses being so formed as to reduce the space between each rotary disk and the fixed disk immediately adjacent thereto from disk to disk toward the forward end of the cylinder.

2. A continuous kneader as defined in claim 1 wherein the number of the projections or the recesses of each fixed disk increases from disk to disk toward the forward end of the cylinder, and the number of the projections or the recesses of each rotary disk similarly increases.

3. A continuous kneader as defined in claim 1 or 2 wherein annular members each surrounding each of the rotary disks in opposed relation to the outer periphery of the disk and annular members interposed between the annular members and serving as the fixed disks are formed as individually independent members and fitted together into the cylinder to provide a kneading section, the cylinder being fastened by tie rods to a cylinder providing a feeding section and to another cylinder providing an extruding section, the rotary shaft including a portion positioned in the feeding section and another portion positioned in the kneading section, the shaft portions being detachably joined together by screw-thread engagement.

4. A continuous kneader as defined in any one of claims 1 to 3 wherein one of the rotary disks has a larger axial width than the other rotary disks and is formed with a screw flight on its outer periphery, and the cylinder surrounding the screw flight has a vent opposed to the flight.

5. A continuous kneader as defined in claim 3 wherein an axial groove is formed in the inner surface of the feeding section cylinder at a portion thereof extending from a charge inlet to the kneading section, and the cylinder upper portion has a vent open to the outside and communicating with the groove.

* * * * *